United States Patent
Aiba

(10) Patent No.: US 9,277,231 B2
(45) Date of Patent: Mar. 1, 2016

(54) PICTURE CODING APPARATUS, PICTURE CODING PROGRAM, PICTURE DECODING APPARATUS, AND PICTURE DECODING PROGRAM

(71) Applicant: JVC KENWOOD Corporation, Yokohama-shi (JP)

(72) Inventor: Hideki Aiba, Moriya (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/304,563

(22) Filed: Jun. 13, 2014

(65) Prior Publication Data
US 2015/0003751 A1    Jan. 1, 2015

(30) Foreign Application Priority Data
Jun. 28, 2013    (JP) .................................. 2013-136986

(51) Int. Cl.
| | |
|---|---|
| H04N 9/00 | (2006.01) |
| H04N 19/182 | (2014.01) |
| H04N 19/593 | (2014.01) |
| H04N 19/11 | (2014.01) |
| H04N 19/14 | (2014.01) |

(52) U.S. Cl.
CPC ............. *H04N 19/182* (2014.11); *H04N 19/11* (2014.11); *H04N 19/14* (2014.11); *H04N 19/593* (2014.11)

(58) Field of Classification Search
CPC ......... G06K 9/34; G06K 9/38; G06K 9/4652; G06T 7/0081; G06T 7/0095
See application file for complete search history.

(56) References Cited

U.S. PATENT DOCUMENTS

| | | | | |
|---|---|---|---|---|
| 2011/0249741 | A1* | 10/2011 | Zhao et al. | 375/240.15 |
| 2012/0158671 | A1* | 6/2012 | Tzur et al. | 707/692 |
| 2012/0328009 | A1* | 12/2012 | Sasai et al. | 375/240.12 |
| 2013/0003852 | A1* | 1/2013 | Yamamoto | 375/240.16 |
| 2013/0016773 | A1* | 1/2013 | Oh | 375/240.03 |
| 2013/0136371 | A1* | 5/2013 | Ikai et al. | 382/224 |
| 2013/0251051 | A1* | 9/2013 | Ikai | 375/240.29 |
| 2013/0287107 | A1* | 10/2013 | Shima | 375/240.12 |
| 2013/0343662 | A1* | 12/2013 | Ando | 382/233 |
| 2014/0064360 | A1* | 3/2014 | Rapaka et al. | 375/240.02 |
| 2014/0105276 | A1* | 4/2014 | Nakamura et al. | 375/240.02 |
| 2014/0105291 | A1* | 4/2014 | Nakamura et al. | 375/240.12 |

FOREIGN PATENT DOCUMENTS

JP     2012-129945 A    7/2012

* cited by examiner

*Primary Examiner* — Jingge Wu
(74) *Attorney, Agent, or Firm* — Venable LLP; Michael A. Sartori; Todd R. Farnsworth

(57) ABSTRACT

A temporary prediction mode determining unit temporarily determines a prediction mode used to code a coding target pixel, based on a relation between the decoded value of a locally decoded pixel neighboring at least one line above the coding target pixel and the decoded values of locally decoded pixels surrounding the neighboring pixel, and then sets a temporary prediction mode index. A final prediction mode determining unit finally determines a prediction mode used to code the coding target pixel, based on the temporary prediction mode index of the coding target pixel and the relation between the decoded value of a locally decoded pixel located at least to the left of the coding target pixel and the decoded values of locally decoded pixels surrounding the pixel located to the left.

6 Claims, 11 Drawing Sheets

| DIFFERENCE VALUE RELATION IN THE TEMPORARY PREDICTION MODE DETERMINING UNIT | | TEMPORARY PREDICTION MODE INDEX | DIFFERENCE VALUE RELATION IN THE FINAL PREDICTION MODE DETERMINING UNIT | SELECTED LOCALLY-DECODED PIXEL SELECTED |
|---|---|---|---|---|
| D11 IS MINIMUM | E11<D01 | 4 | F01<Fm11 | P(0,1) |
| | | | F01≧Fm11 | P(1,1) |
| | E11≧D01 | 0 | | P(1,1) |
| D10 IS MINIMUM | | 1 | | P(1,0) |
| D01 IS MINIMUM | | 2 | | P(0,1) |
| Dm11 IS MINIMUM | | 3 | | P(-1,1) |

PICTURE CODING APPARATUS, PICTURE CODING PROGRAM, PICTURE DECODING APPARATUS, AND PICTURE DECODING PROGRAM

CROSS REFERENCE TO RELATED APPLICATION

This application is based upon and claims the benefit of priority from the prior Japanese Patent Application No. 2013-136986, filed Jun. 28, 2013, the contents of which are incorporated herein by references.

BACKGROUND OF THE INVENTION

1. Field of the Invention

The present invention relates to a picture coding and decoding technique used to compress and expand a picture signal, and more particularly, to a technique by which to compress and expand picture data, which is buffered in a frame memory, when the picture signal is processed between frames.

2. Description of the Related Art

When an image or picture processing, such as the scaling or frame interpolation, is carried out, frame images or pictures need to be temporarily saved in a frame memory. In recent years, the images and pictures having high resolution are on the increase. This entails a rise in the clock rate, an increase in the number of terminals, an increase in memory capacity and so forth to transfer the high-resolution pictures between an arithmetic circuit and the frame memory. Thus a picture compression technology to reduce the transmission quantity of picture data in a system is in demand. Since such a picture compression technology aims to reduce the circuit scale and load within the system, it is required that the pictures be compressed in a simple manner and at a low load and, at the same time, the image degradation be suppressed to the minimum.

One of such methods for compressing the picture signal is a method where the error between a pixel of interest and locally-decoded pixels surrounding the pixel of interest is coded. In this method, a pixel most approximate to the pixel of interest among the neighboring pixels of the pixel of interest is selected, so that the prediction error value can be minimized. Proposed is a method where the pixel most approximate to the pixel of interest is estimated from a relation between the value of a pixel located one line above the pixel of interest and the locally decoded values of its surrounding pixels (see Reference (1) in the following Related Art List). Estimating a prediction direction by the use of the pixel one line above increases the time required to determine the prediction direction. As a result, an increase in the circuit scale can be suppressed.

RELATED ART LIST (1) Japanese Unexamined Patent Application Publication (Kokai) No. 2012-129945.

The relation between the pixel one line above the pixel of interest and its neighboring pixels and the relation between the actual pixel of interest and its neighboring pixels are identical to each other in most cases but they differ in rare cases. A typical example of rare cases where the difference occurs between the above relations is a cross point of checker patterns as shown in FIG. 3 and FIG. 7. For example, in the case of FIG. 7, the prediction direction is determined to be an upper-left direction, based on a relation between the value of a pixel P(0, 1) located one line above a pixel of interest P(0, 0) and the locally decoded values of its surrounding pixels of P(0, 1). However, the value of the pixel of interest P(0, 0) to be actually coded and the value of the upper-left pixel P(1, 1) differ greatly from each other. When the prediction error is generated between these two pixels, coding efficiency is reduced.

SUMMARY OF THE INVENTION

The present invention has been made in view of the foregoing circumstances, and a purpose thereof is to enhance the coding efficiency by employing a method whereby the relation between a pixel of interest and its neighboring pixels is estimated based on the relation between a pixel located at least one line above the pixel of interest and its neighboring pixels so as to generate a prediction error value based on the estimated relation.

In order to resolve the above-described problems, a picture coding apparatus (10) according to one embodiment of the present invention includes: a temporary prediction mode determining unit (16) configured to temporarily determine a prediction mode used to code a coding target pixel, based on a relation between a decoded value of a locally decoded pixel neighboring at least one line above the coding target pixel and decoded values of locally decoded pixels surrounding said neighboring pixel, and configured to set a value, indicating the temporarily determined prediction mode, to a temporary prediction mode index; a temporary prediction mode index storage (17) configured to store the temporary prediction mode index; a final prediction mode determining unit (18) configured to finally determine a prediction mode used to code the coding target pixel, based on the temporary prediction mode index of the coding target pixel read from the temporary prediction mode index storage (17) and a relation between a decoded value of a locally decoded pixel located at least to the left of the coding target pixel and decoded values of locally decoded pixels surrounding said pixel located at least to the left thereof; a prediction pixel selector (19) configured to select a prediction pixel of the coding target pixel, based on the finally determined prediction mode; a subtractor (11) configured to subtract the value of the prediction pixel from the value of the coding target pixel; and a prediction error coding unit (12) configured to code a prediction error value derived by the subtractor (11).

Another embodiment of the present invention relates to a picture coding method. The picture coding method includes: temporarily determining a prediction mode used to code a coding target pixel, based on a relation between a decoded value of a locally decoded pixel neighboring at least one line above the coding target pixel and decoded values of locally decoded pixels surrounding said neighboring pixel, and setting a value, indicating the temporarily determined prediction mode, to a temporary prediction mode index; finally determining a prediction mode used to code the coding target pixel, based on the temporary prediction mode index of the coding target pixel and a relation between a decoded value of a locally decoded pixel located at least to the left of the coding target pixel and decoded values of locally decoded pixels surrounding said pixel located at least to the left thereof; selecting a prediction pixel of the coding target pixel, based on the finally determined prediction mode; subtracting the value of the prediction pixel from the value of the coding target pixel; and coding a prediction error value derived by the subtracting.

Still another embodiment of the present invention relates to a picture decoding apparatus (20). The picture decoding apparatus includes: a temporary prediction mode determining unit (26) configured to temporarily determine a prediction mode used to decode a decoding target pixel, based on a relation between a decoded value of an already-decoded pixel neighboring at least one line above the decoding target pixel and decoded values of already-decoded pixels surrounding said neighboring pixel, and configured to set a value, indicating the temporarily determined prediction mode, to a temporary prediction mode index; a temporary prediction mode index storage (27) configured to store the temporary prediction mode index; a final prediction mode determining unit (28) configured to finally determine a prediction mode used to decode the decoding target pixel, based on the temporary prediction mode index of the decoding target pixel read from the temporary prediction mode index storage (27) and a relation between a decoded value of an already-decoded pixel located at least to the left of the decoding target pixel and decoded values of already-decoded pixels surrounding said pixel located at least to the left thereof; a prediction pixel selector (29) configured to select a prediction pixel of the decoding target pixel, based on the finally determined prediction mode; a prediction error decoding unit (21) configured to decode a prediction error value of the coded decoding-target pixel; and an adder (22) configured to restore the value of the decoding target pixel by adding up the selected prediction pixel and the decoded prediction error value.

Still another embodiment of the present invention relates to a picture decoding method. The picture decoding method includes: temporarily determining a prediction mode used to decode a decoding target pixel, based on a relation between a decoded value of an already-decoded pixel neighboring at least one line above the decoding target pixel and a decoded value of an already-decoded pixel surrounding said neighboring pixel, and setting a value, indicating the temporarily determined prediction mode, to a temporary prediction mode index; finally determining a prediction mode used to decode the decoding target pixel, based on the temporary prediction mode index of the decoding target pixel and a relation between a decoded value of an already-decoded pixel located at least to the left of the decoding target pixel and a decoded value of an already-decoded pixel surrounding said pixel located at least to the left thereof; selecting a prediction pixel of the decoding target pixel, based on the finally determined prediction mode; decoding a prediction error value of the coded decoding-target pixel; and restoring the value of the decoding target pixel by adding up the selected prediction pixel and the decoded prediction error value.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings, which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
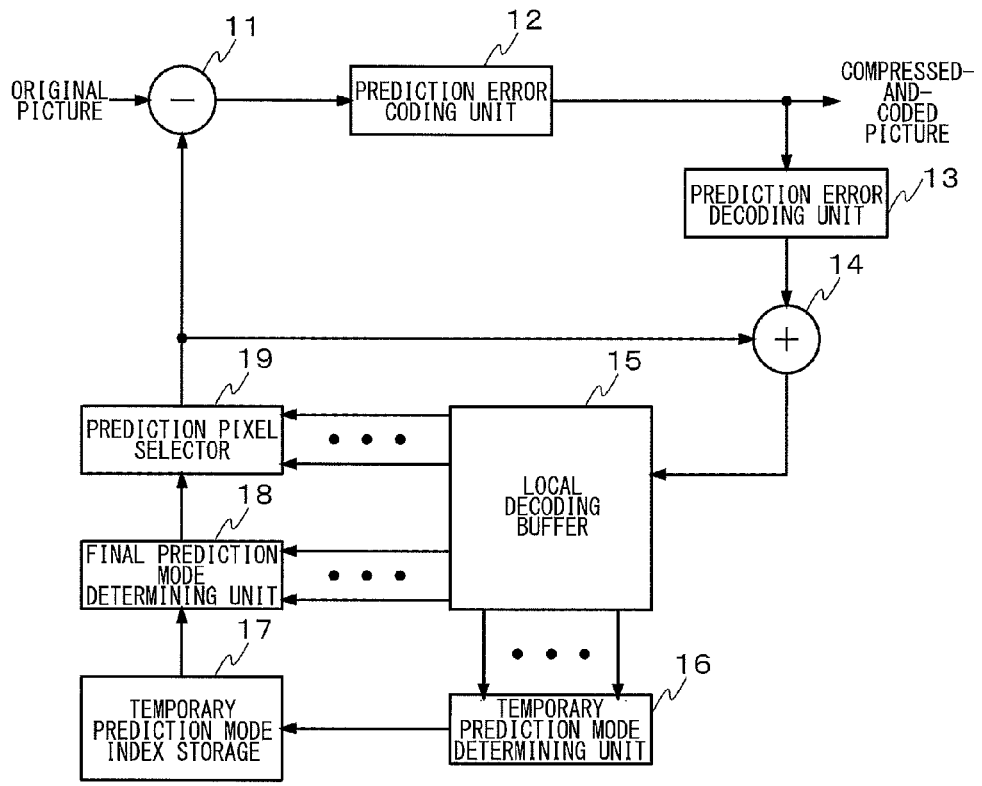
FIG. 1 shows a structure of a picture coding apparatus according to a first embodiment of the present invention.

FIG. 1 shows a structure of a picture coding apparatus 10 according to a first embodiment of the present invention. The picture coding apparatus 10 includes a subtractor 11, a prediction error coding unit 12, a prediction error decoding unit 13, an adder 14, a local decoding buffer 15, a temporary prediction mode determining unit 16, a temporary prediction mode index storage 17, a final prediction mode determining unit 18, and a prediction pixel selector 19.

The subtractor 11 subtracts a prediction pixel value of a pixel to be coded (hereinafter the "pixel to be coded" will be referred to as a "coding target pixel" also), which has been selected by the prediction pixel selector 19, from a value of a coding target pixel of an inputted original picture. The subtractor 11 outputs a prediction error value derived by the subtraction, to the prediction error coding unit 12. The prediction error coding unit 12 codes the inputted prediction error value in accordance with a predetermined compression-coding scheme. The prediction error coding unit 12 outputs the coded predictor error value to the exterior and simultaneously outputs it to the prediction error decoding unit 13.

The prediction error decoding unit 13 locally decodes the coded predictor error value in accordance with an expansion-decoding scheme corresponding to the aforementioned compression-coding scheme. The adder 14 adds up the locally decoded prediction error value and the prediction pixel value selected by the prediction pixel selector 19, thereby restoring a value of the locally decoded pixel. Though not shown in FIG. 1, a timing adjustment circuit is provided between the prediction pixel selector 19 and the adder 14. The timing adjustment circuit outputs the prediction pixel value to the adder 14 in a manner such that the prediction pixel value inputted from the prediction pixel selector 19 is delayed for a time duration equivalent to the sum of a compression and coding time, required by the prediction error coding unit 12, and an expansion and decoding time, required by the prediction error decoding unit 13.

The adder 14 outputs the restored locally-decoded pixel value to the local decoding buffer 15. The local decoding buffer 15 is a buffer used in a FIFO (First In, First Out) method and is a buffer that temporarily stores the locally decoded pixel values for the number of pixels set. For example, there is provided a storage area for storing the number of pixels on two lines in a frame or coding block.

The temporary prediction mode determining unit 16 temporarily determines a prediction mode used to code a coding target pixel, based on a relation between a decoded value of a locally decoded pixel neighboring one line above the coding target pixel and decoded values of locally decoded pixels surrounding said neighboring pixel.

In the present embodiment, a pixel located immediately above the coding target pixel is assumed as the locally decoded pixel neighboring one line above the coding target pixel. Hereinafter, this pixel, which is located just above the coding target pixel is called a first prediction point pixel. In the present embodiment, an upper-left neighboring pixel, an immediately-above pixel, an upper-right neighboring pixel, and a left neighboring pixel of the first prediction point pixel are assumed as the locally decoded pixels surrounding the first prediction point pixel. Hereinafter, the upper-left neighboring pixel, the immediately-above pixel, the upper-right neighboring pixel, and the left neighboring pixel of the first prediction point pixel are called a first reference pixel, a second reference pixel, a third reference pixel, and a fourth reference pixel, respectively. Assume, in the present embodiment, that four predictions are candidates for the prediction modes. The four predictions, which involves four directions, are an obliquely-left-upward direction (hereinafter referred to simply as "upper-left direction") prediction, an upward direction prediction, an obliquely-right-upward direction (hereinafter referred to simply as "upper-right direction") prediction, and leftward prediction. If the computation capacity allows, an average-value mode and so forth may be added.

The temporary prediction mode determining unit 16 reads out the decoded values of the first prediction point pixel, the second reference pixel, the third reference pixel and the fourth reference pixel from the local decoding buffer 15 and then temporarily determines a prediction mode, based on the relation among those decoded values. The temporary prediction mode determining unit 16 sets a value, indicating the temporarily determined prediction mode, in a temporary prediction mode index and then outputs said value set in the index to the temporary prediction mode index storage 17. A detailed description of processes for temporarily determining the prediction mode and the temporary prediction mode index will be given later.

The temporary prediction mode index storage 17 temporarily stores the temporary prediction mode index inputted from the temporary prediction mode determining unit 16. The temporary prediction mode index storage 17 has an area used to store the temporary prediction mode index for at least one line. The temporary prediction mode index storage 17 delays the inputted temporary prediction mode index by a processing time for one line and then outputs the delayed temporary prediction mode index to the final prediction mode determining unit 18.

The final prediction mode determining unit 18 finally determines a prediction mode used to code the coding target pixel, based on the temporary prediction mode index of the coding target pixel read from the temporary prediction mode index storage 17 and a relation between a decoded value of a locally decoded pixel located at least to the left of the coding target pixel and decoded values of locally decoded pixels surrounding said pixel located at least to the left thereof. In the present embodiment, a left neighboring pixel of the coding target pixel is called a second prediction point pixel, as appropriate. In the present embodiment, a left neighboring pixel of the second prediction point pixel (which corresponds to the aforementioned fourth reference pixel) and an upper-right neighboring pixel thereof (which corresponds to the first prediction point pixel) are assumed as the locally decoded pixels surrounding the second prediction point pixel.

The final prediction mode determining unit 18 reads out the temporary prediction mode index from the temporary prediction mode index storage 17, reads out the decoded values of the second prediction point pixel, the fourth reference pixel and the first prediction point pixel from the local decoding buffer 15. And the final prediction mode determining unit 18 finally determines a prediction mode, based on the temporary prediction mode index and the relation between the aforementioned decoded values. The final prediction mode determining unit 18 outputs a value indicating the finally determined prediction mode to the prediction pixel selector 19. A detailed description of a process for finally determining the prediction mode will be given later.

The prediction pixel selector 19 selects a prediction pixel of the coding target pixel, based on the value, indicating the prediction mode, which is inputted from the final prediction mode determining unit 18, and then reads out the decoded value of this prediction pixel from the local decoding buffer 15. More specifically, one of the upper-left neighboring pixel, the immediately-above pixel, the upper-right neighboring pixel and the left neighboring pixel of the coding target pixel stored in the local decoding buffer 15 is selected according to the prediction mode. The prediction pixel selector 19 outputs the value of the selected prediction pixel to the subtractor 11 and the adder 14.

A description is given hereunder of a picture compression processing carried out by the picture coding apparatus 10 according to the present embodiment, using specific examples. In general, as compared to the case where the pixel value itself is directly coded, an amount of codes can be reduced if a difference between a given pixel and a neighboring pixel is coded. If, for example, each gradation of RGB is expressed by 8 bits, 24 bits will be required for each pixel. In contrast to this, if a surrounding pixel that neighbors an object pixel, which is a pixel of interest or a coding target pixel, is of the same gradation as that of the object pixel, the difference between the surrounding pixel and the object pixel will be zero and therefore the amount of codes for the object pixel can be significantly reduced. In this manner, the smaller the difference between the object pixel and its surrounding pixel is, the greater the reduced amount of codes for the object pixel will be. In the light of this, generally used is a processing method where, among a plurality of surrounding pixels that neighbor the object pixel, a pixel whose difference from the surrounding pixels is the minimum is searched.

Figure 2:
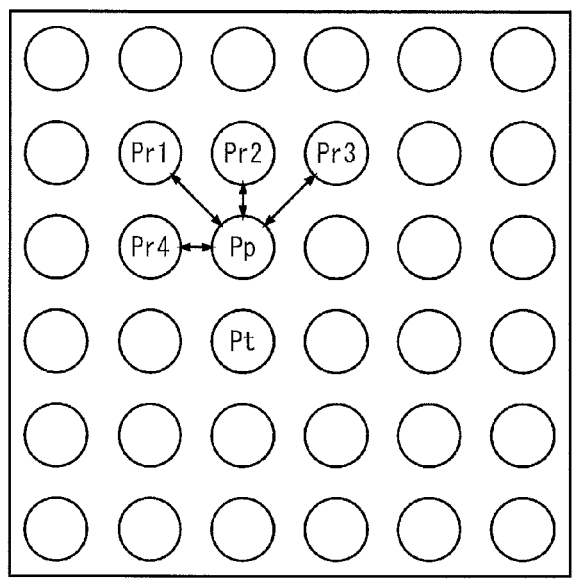
FIG. 2 is a diagram to explain a basic processing for pixel prediction.

FIG. 2 is a diagram to explain a basic processing for pixel prediction. Of a plurality of pixels that neighbor the object pixel, pixels used for the prediction are a pixel, located one line above the object pixel, and a pixel, located to the left of the object pixel. These pixels used for the prediction are pixels coded before the object pixel is coded, in the coding sequence, and their pixel values can be referenced by locally decoding them. In the present embodiment, candidates for a prediction pixel are four pixels that are an upper-left neighboring pixel of the object pixel, an immediately-above pixel thereof, an upper-right neighboring pixel thereof, and a left neighboring pixel thereof.

A basic procedure is that the difference value between the object pixel and each of the aforementioned four pixel is calculated and then a pixel having the minimum difference value is selected as the prediction pixel. In a compression and coding method using this pixel prediction, the coding of the object pixel is only enabled if the prediction pixel is determined, and therefore a high-speed process of determining the prediction pixel is required. For the purpose of achieving the high-speed process, a more sophisticated arithmetic circuit and/or a complicated circuit configuration need to be implemented.

As illustrated in FIG. 2, in the present embodiment, a pixel located one line above an object pixel Pt (namely, a pixel located just above the object pixel Pt) is used as a substitute pixel (hereinafter referred to as "prediction point pixel Pp") for the object pixel Pt in the prediction pixel determining process. A difference value between the prediction point pixel Pp and each of a first reference pixel Pr1, a second reference pixel Pr2, a third reference pixel Pr3 and a fourth reference pixel Pr4, which are all located adjacent to the prediction point pixel Pp. Here, the first reference pixel Pr1 is the upper-left neighboring pixel of the prediction point pixel Pp; the second reference pixel Pr2 is a pixel positioned just above the prediction point pixel Pp; the third reference pixel Pr3 is the upper-right neighboring pixel thereof; and the fourth reference pixel Pr4 is the left neighboring pixel thereof. In this manner, the prediction directions of the object pixel Pt are specified using the prediction point pixel Pp, which is located one line above the objection pixel Pt, so that a sufficient time for the prediction pixel determining process can be ensured. Thus, the circuitry can be simplified. Normally, the prediction direction of the object pixel Pt is identical to that of the prediction point pixel Pp located one line above the object pixel Pt. However, in rare cases, the prediction direction of the object pixel Pt does not match that of the prediction point pixel Pp.

Figure 3:
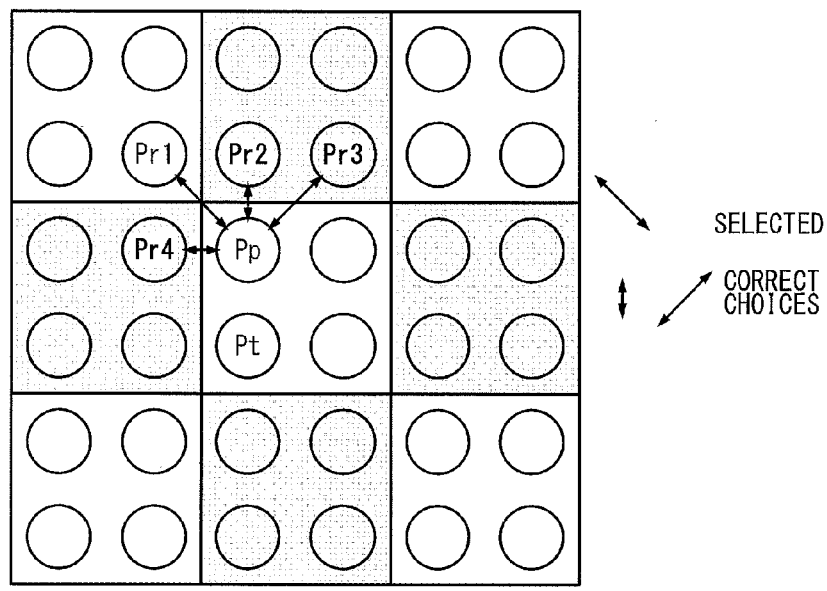
FIG. 3 is a diagram illustrating a pixel prediction for a checker pattern picture.

FIG. 3 illustrates a pixel prediction for a checker pattern picture. If, as shown in FIG. 3, the prediction point pixel Pp is an upper-left vertex pixel of a block that forms a checker pattern (hereinafter referred to simply as a "checker block"), a result of the prediction pixel determining process carried out based on the prediction point pixel Pp will be a neighboring pixel in the upper-left direction. However, an object pixel Pt and an upper-left neighboring pixel Pr4 of the object pixel Pt belong to different blocks of different colors, respectively, and therefore the difference value between the object pixel Pt and the pixel Pr4 will be large. Normally, if an immediately-above pixel or an upper-right neighboring pixel of the object pixel Pt is selected as the prediction pixel for the object pixel Pt, the difference value will be small. This is because the object pixel Pt, the immediately-above pixel and the upper-right neighboring pixel belong to the same block of the same color. As described above, if the prediction point pixel is an upper-left vertex pixel of a checker block, the amount of codes for the object pixel will not be minimized. The picture coding apparatus 10 according to the present embodiment achieves a prediction processing where the prediction accuracy does not deteriorate even though the prediction point pixel is a vertex pixel of a checker block.

Figure 4:
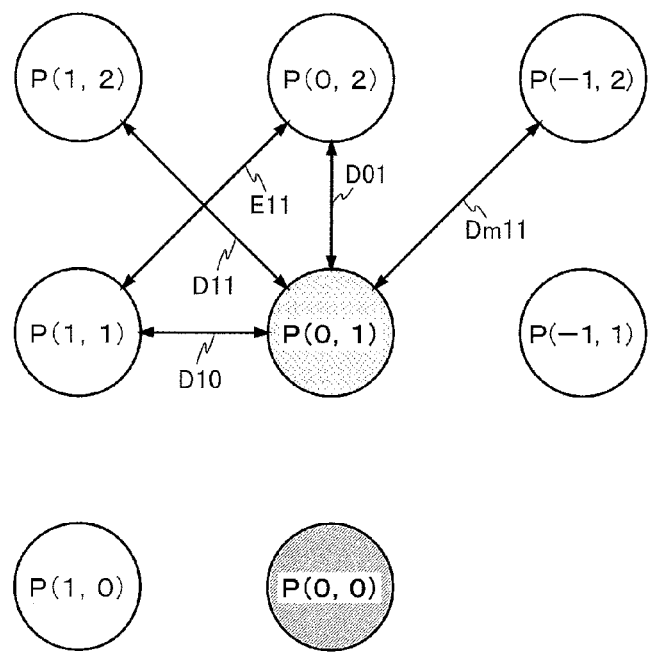
FIG. 4 is a diagram to explain a temporary prediction mode determining process performed by a picture coding apparatus according to a first embodiment of the present invention.

FIG. 4 is a diagram to explain a temporary prediction mode determining process performed by the picture coding apparatus 10 according to the first embodiment of the present invention. The temporary prediction mode determining unit 16 temporarily determines the prediction mode used to code a coding target pixel P(0, 0), based on a relation between each value of a first prediction point pixel P(0, 1), which is located immediately above the coding target pixel P(0, 0), a first reference pixel P(1, 2), which is an upper-left neighboring pixel of the first prediction point pixel P(0, 1), a second reference pixel P(0, 2), which is an immediately-above pixel of the first prediction point pixel P(0, 1), a third reference pixel P(−1, 2), which is an upper-right neighboring pixel of the first prediction point pixel P(0, 1), and a fourth reference pixel P(1, 1), which is a left neighboring pixel of the first prediction point pixel P(0, 1).

More specifically, the temporary prediction mode determining unit 16 calculates a difference value D11 between the first prediction point pixel P(0, 1) and the first reference pixel P(1, 2), a difference value D01 between the first prediction point pixel P(0, 1) and the second reference pixel P(0, 2), a difference value Dm11 between the first prediction point pixel P(0, 1) and the third reference pixel P(−1, 2), and a difference value D10 between the first prediction point pixel P(0, 1) and the fourth reference pixel P(1, 1). Hereinafter, the difference values calculated are expressed by absolute values. The calculating formulae for the difference values D11, D01, Dm11, and D10 are shown below.

$$D11=|P(0,1)-P(1,2)|$$

$$D01=|P(0,1)-P(0,2)|$$

$$Dm11=|P(0,1)-P(-1,2)|$$

$$D10=|P(0,1)-P(1,1)|$$

If the difference value D01 is the minimum among the four difference values, the temporary prediction mode determining unit 16 will set a value indicating an upward prediction to the temporary prediction mode index. If the difference value Dm11 is the minimum, a value indicating an upper-right prediction will be set to the temporary prediction mode index. If the difference value D10 is the minimum, a value indicating a left prediction will be set to the temporary prediction mode index. If the difference value D11 is the minimum, the temporary prediction mode determining unit 16 will calculate a difference value E11 between the second reference pixel P(0, 2) and the fourth reference pixel P(1, 1). The calculating formula for the difference value E11 is shown below.

$$E11=|P(1,1)-P(0,2)|$$

If the difference value E11 and the difference value D11 are compared with each other and if E11 is greater than or equal to D11 (E11≥D11), the temporary prediction mode determining unit 16 will set a value indicating an upper-left prediction to the temporary prediction mode index. If E11 is less than D11 (E11<D11)), the temporary prediction mode determining unit 16 will set a value, indicating the possibility that the first prediction point pixel P(0, 1) is an upper-left vertex pixel of a checker block, to the temporary prediction mode index.

Figure 5:
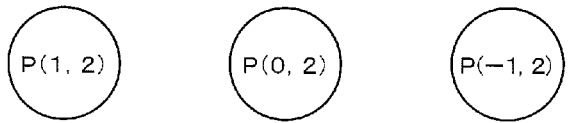
FIG. 5 is a diagram to explain a final prediction mode determining process performed by a picture coding apparatus according to a first embodiment of the present invention.

FIG. 5 is a diagram to explain a final prediction mode determining process performed by the picture coding apparatus 10 according to the first embodiment of the present invention. If a value, which indicates the upper-left prediction, the upward prediction, the upper-right prediction or the left prediction, is set to the temporary prediction mode index, the final prediction mode determining unit 18 finally determines the prediction direction directly to be the prediction mode used to code the coding target pixel P(0, 0).

If the value, indicating the possibility that the first prediction point pixel P(0, 1) is the upper-left vertex pixel, is set to the temporary prediction mode index, the final prediction mode determining unit 18 will finally determine a prediction mode, based on a relation between each value of a second prediction point pixel P(1, 0), which is a left neighboring pixel of the coding target pixel P(0, 0), the fourth reference pixel P(1, 1), which is an immediately-above pixel of the second prediction point pixel P(1, 0), and the first prediction point pixel P(0, 1), which is an upper-right neighboring pixel of the second prediction point pixel P(1, 0).

More specifically, the final prediction mode determining unit 18 calculates a difference value F01 between the second prediction point pixel P(1, 0) and the fourth reference pixel P(1, 1) and a difference value Fm11 between the second prediction point pixel P(1, 0) and the first reference pixel P(0, 1). The calculating formulae for the difference values F01 and Fm11 are shown below.

$$F01=|P(1,1)-P(1,0)|$$

$$Fm11=|P(0,1)-P(1,0)|$$

If the difference value F01 is greater than or equal to the difference value Fm11 (F01≥Fm11), the final prediction mode determining unit 18 will determine the upper-left prediction to be the final prediction mode. If the difference value F01 is less than the difference value Fm11 (F01<Fm11), the upward prediction will be determined to be the final prediction mode.

Figure 6:
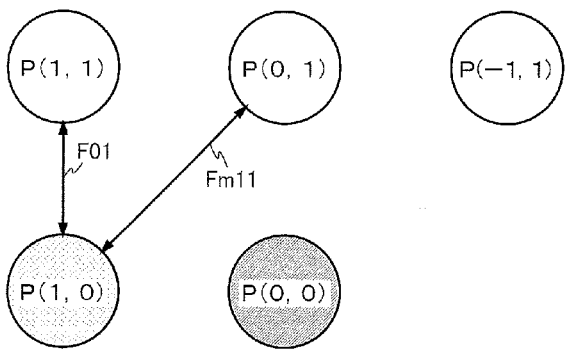
FIG. 6 is a table summarizing a prediction mode determining process performed by a temporary prediction mode determining unit and a final prediction mode determining unit.

FIG. 6 is a table summarizing an exemplary prediction mode determining process performed by the temporary prediction mode determining unit 16 and the final prediction mode determining unit 18. In this example shown in FIG. 6, a temporary prediction mode index "0" shows a value indicating an upper-left prediction. Similarly, the index "1" shows a value indicating a left prediction, the index "2" a value indicating an upward prediction, the index "3" a value indicating an upper-right prediction; and the index "4" a value indicating the possibility that the first prediction point pixel P(0, 1) is an upper-left vertex pixel of a checker block.

Figure 7:
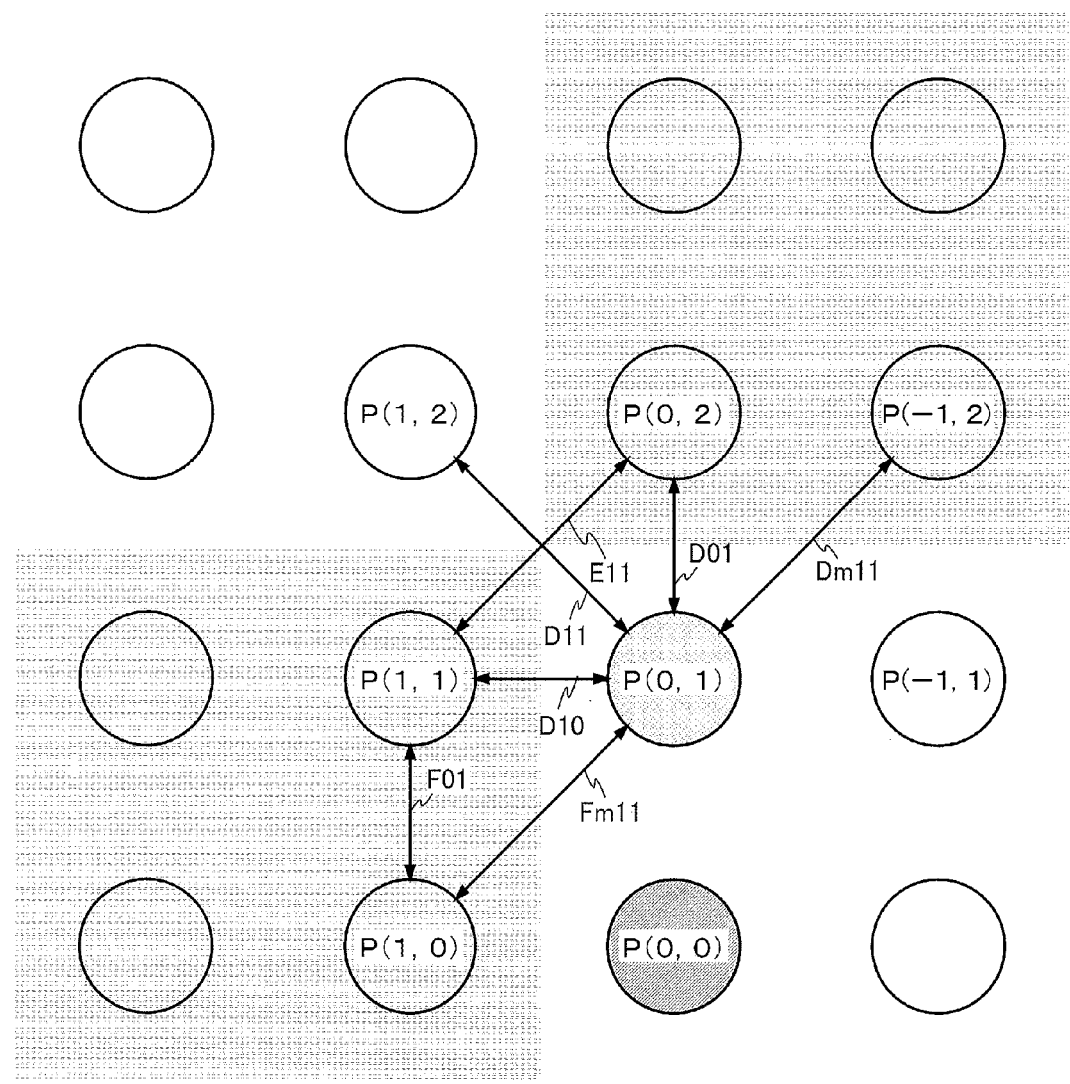
FIG. 7 shows a picture where a first prediction point pixel P(0, 1) is an upper-left vertex pixel of a checker block.

FIG. 7 shows a picture where the first prediction point pixel p(0, 1) is an upper-left vertex pixel of a checker block. In this case, the difference value D11 is the minimum in the determining process carried out by the temporary prediction mode determining unit 16, whereas the difference value E11 is smaller than the difference value D01. Also, the difference value F01 is smaller than the difference value Fm11, in the determining process carried out by the final prediction mode determining unit 18. Thus, the prediction pixel (namely, a selected locally-decoded pixel) of the object pixel P(0, 0) is a pixel P(0, 1), which is an immediately-above pixel of the object pixel P(0, 0), so that the prediction error of the object pixel P(0, 0) can be suppressed to the minimum.

Figure 8:
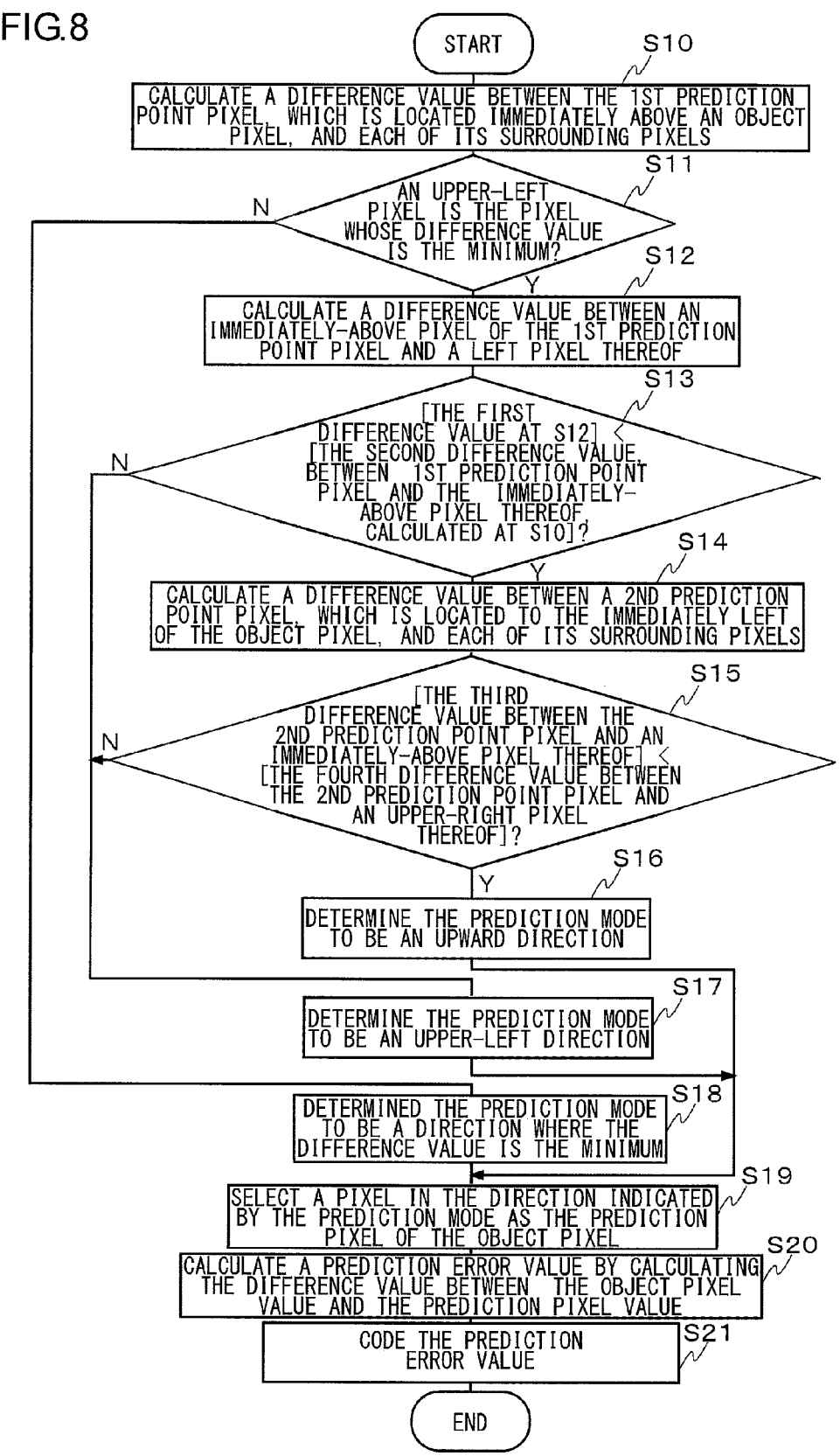
FIG. 8 is a flowchart to explain a coding process, for an object pixel, carried out by a picture coding apparatus according to a first embodiment of the present invention.

FIG. 8 is a flowchart to explain a coding process, for an object pixel, carried out by the picture coding apparatus 10 according to the first embodiment of the present invention. The temporary prediction mode determining unit 16 calculates a difference value between the first prediction point pixel, which is located just above (immediately above) the coding target pixel and each of pixels, which surround the first prediction point pixel (S10). The temporary prediction mode determining unit 16 determines if the surrounding pixel whose difference value is the minimum is the upper-left neighboring pixel (S11). If the surrounding pixel having the minimum value is not the upper-left neighboring pixel (N of S11), the temporary prediction mode determining unit 16 and the final prediction mode determining unit 18 will determine a prediction mode to be a direction where the difference value is the minimum (S18). If the surrounding pixel having the minimum value is the upper-left neighboring pixel (Y of S11), the temporary prediction mode determining unit 16 will calculate a difference value between an immediately-above pixel of the first prediction point pixel and the left neighboring pixel thereof (S12).

The temporary prediction mode determining unit 16 compares the difference value (first difference value), between the immediately-above pixel of the first prediction point pixel and the left pixel thereof, calculated at Step S12 with the difference value (second difference value), between the first prediction point pixel and the immediately-above pixel of the first prediction point pixel, calculated at Step S10 (S13). If the first difference value is greater than or equal to the second difference value (N of S13), the temporary prediction mode determining unit 16 and the final prediction mode determining unit 18 will determine a prediction mode to be an upper-left direction (S17). If the first difference value is less than the second difference value (Y of S13), the temporary prediction mode determining unit 16 will calculate a difference value of a second prediction point pixel, which is located to the immediately left of the coding target pixel, and each of surrounding pixels that surround the second prediction point pixel (S14).

The temporary prediction mode determining unit 16 compares the difference value (third difference value), between the second prediction point pixel and an immediately-above pixel of this second prediction point pixel, with the difference value (fourth difference value), between the second prediction point pixel and an upper-right neighboring pixel of this second prediction point pixel (S15). If the third difference value is greater than or equal to the fourth difference value (N of S15), the temporary prediction mode determining unit 16 and the final prediction mode determining unit 18 will determine a prediction mode to be an upper-left direction (S17). If the third difference value is less than the fourth difference value (Y of S15), the temporary prediction mode determining unit 16 and the final prediction mode determining unit 18 will determine a prediction mode to be an upward direction (S16).

After the prediction mode has been determined (S16, S17, or S18), the prediction pixel selector 19 selects a pixel, which is positioned adjacent to a direction indicated by the prediction mode, as the prediction pixel of the coding target pixel (S19). The subtractor 11 calculates the prediction error value obtained by subtracting the prediction pixel value of a coding target pixel and the value of the coding target pixel itself (S20). The prediction error coding unit 12 codes the thus calculated prediction error (S21).

In the above description, for the purpose of determining whether or not the first prediction point pixel p(0, 1) is an upper-left vertex pixel of a checker block, the difference value E11 between the second reference pixel P(0, 2) and the fourth reference pixel P(1, 1) and the difference value D11 between the first prediction point pixel P(0, 1) and the first reference pixel P(1, 2) are compared with each other. And if the difference value E11 is smaller than the difference value D11, it will be determined that there is a possibility that the first prediction point pixel P(0, 1) is an upper-left vertex pixel of the checker block. In order to enhance this determining or evaluation accuracy, the following conditions may be added.

Figure 9:
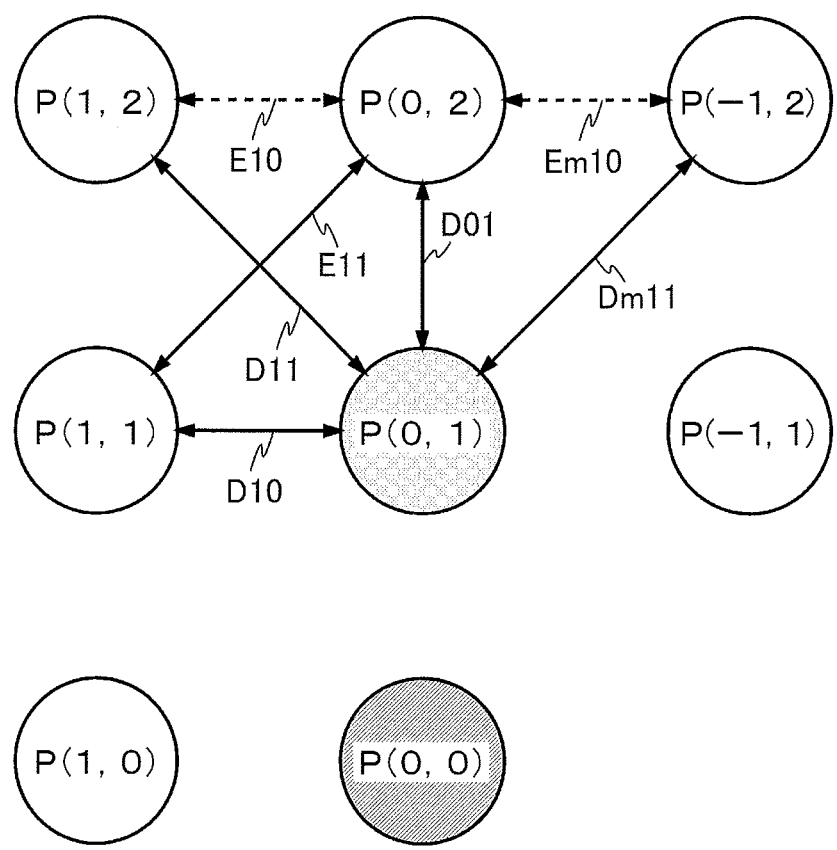
FIG. 9 is a diagram to explain a modification of FIG. 4.

FIG. 9 is a diagram to explain a modification of FIG. 4. In addition to the difference value E11 between the second reference pixel P(0, 2) and the fourth reference pixel P(1, 1), the temporary prediction mode determining unit 16 calculates a difference value E10 between the first reference pixel P(1, 2) and the second reference pixel P(0, 2) and a difference value Em10 between the second reference pixel P(0, 2) and the third reference pixel P(−1, 2). The calculating formulae for the difference values E10 and Em10 are shown below.

$$E10=|P(1,2)-P(0,2)|$$

$$Em10=|P(0,2)-P(-1,2)|$$

If the following decision inequalities are all met, the temporary prediction mode determining unit 16 will set a value, indicating the possibility that the first prediction point pixel P(0, 1) is an upper-left vertex pixel of a checker block, to the temporary prediction mode index. If at least one of the following decision inequalities is not met, the temporary prediction mode determining unit 16 will set a value indicating an upper-left prediction to the temporary prediction mode index.

$$E11 < D11$$

$$Em10 < E10$$

$$Em10 < D01$$

Instead of directly using the above decision inequalities in the above-described prediction mode determining process, each difference value may be weighted and/or priority levels may be assigned among the difference values. A designer may arbitrarily set the weightings and the priority levels based on empirical rules.

Suppose, for example, that whether or not the first prediction point pixel p(0, 1) is an upper-left vertex pixel of a checker block is determined, based on the difference value D11 between the first prediction point pixel P(0, 1) and the first reference pixel P(1, 2), the difference value D01 between the first prediction point pixel P(0, 1) and the second reference pixel P(0, 2), the difference value Dm11 between the first prediction point pixel P(0, 1) and the third reference pixel P(−1, 2) and the difference value D10 between the first prediction point pixel P(0, 1) and the fourth reference pixel P(1, 1). Then, for example, the following decision inequalities may be used.

$$D11 < D01/2$$

$$D11 < Dm11/2$$

$$D11 < D10/2$$

In other words, the temporary prediction mode determining unit 16 determines whether or not the difference value D11 between the first prediction point pixel P(0, 1) and the first reference pixel P(1, 2), which is the upper-left neighboring pixel of the pixel P(0, 1), is dominantly smaller than all of the other difference values than the difference value D11. Here, all the difference values other than the difference value D11 are the difference value D01 between the pixel P(0, 1) and the second reference pixel P(0, 2), which is an immediately-above pixel of the pixel P(0, 1), the difference value Dm11 between the pixel P(0, 1) and the third reference pixel P(−1, 2), which is an upper-right neighboring pixel thereof, and the difference value D10 between the pixel P(0, 1) and the fourth reference pixel P(1, 1), which is a left neighboring pixel thereof. If the above decision inequalities are all met, the temporary prediction mode determining unit 16 will execute the following decision inequalities. If at least one of the above decision inequalities is not met, the temporary prediction mode determining unit 16 will set a direction, where the difference value is the minimum, to the temporary prediction mode index.

$$E11 < D11/2$$

$$Em10 < E10/2$$

$$Em10 < D01/2$$

If the above decision inequalities are all met, the temporary prediction mode determining unit 16 will determine that there is a possibility that the first prediction point pixel P(0, 1) is an upper-left vertex pixel of the checker block. In the above example, the weightings are set such that the difference value D01, the difference value Dm11, the difference value D10, the difference value D11 and the difference value E10 are made small. In order to simplify the computational processing, the weighting factors are set to "½". If, for example, a given value is shifted to the right by one bit, the difference value D01, the difference value Dm11, the difference value D10, the difference value D11 and the difference value E10 can be weighted by one-half. With these weightings employed, whether or not the first prediction point pixel P(0, 1) is an upper-left vertex pixel of the checker block can be detected with a higher accuracy.

A description has been given so far of examples where the processes for determining whether or not the first prediction point pixel P(0, 1) is an upper-left vertex pixel of the checker block are added to the basic processing for determining a prediction direction. Hereinbelow, a description will be given of examples where the processes for determining whether or not the first prediction point pixel P(0, 1) is a vertex pixel other than the upper-left vertex pixel of a checker block are added thereto.

Figure 10:
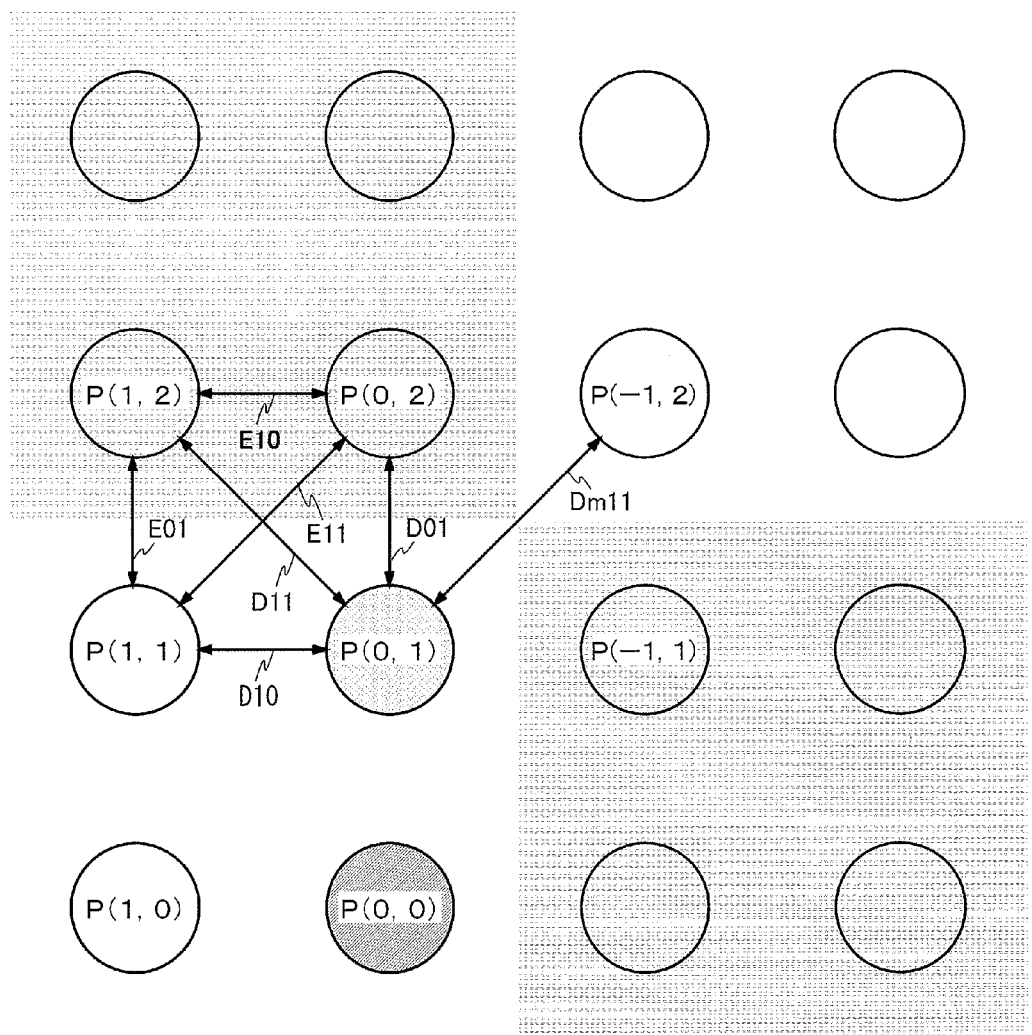
FIG. 10 is a diagram to explain a determining process for determining whether or not a first prediction point pixel P(0, 1) is an upper-right vertex pixel of a checker block.

FIG. 10 is a diagram to explain a determining process for determining whether or not the first prediction point pixel P(0, 1) is an upper-right vertex pixel of a checker block. The temporary prediction mode determining unit 16 calculates a difference value D11 between the first prediction point pixel P(0, 1) and the first reference pixel P(1, 2), a difference value D01 between the first prediction point pixel P(0, 1) and the second reference pixel P(0, 2), a difference value Dm11 between the first prediction point pixel P(0, 1) and the third reference pixel P(−1, 2), and a difference value D10 between the first prediction point pixel P(0, 1) and the fourth reference pixel P(1, 1).

If the difference value Dm11 is the minimum among the four difference values, the temporary prediction mode determining unit 16 will calculate a difference value E10 between the first reference pixel P(1, 2) and the second reference pixel P(0, 2), a difference value E01 between the first reference pixel P(1, 2) and the fourth reference pixel P(1, 1), and a difference value E11 between the second reference pixel P(0, 2) and the fourth reference pixel P(1, 1). If the difference value E10 is smaller than the difference value E01 and if the difference value E10 is smaller than the difference value E11, the temporary prediction mode determining unit 16 will determine that the first prediction point pixel P(0, 1) is more likely to an upper-right vertex pixel of a checker block and will set one of the prediction directions other than the upper-right direction to the temporary prediction mode index. For example, the left direction is set. The final prediction mode determining unit 18 finally determines the prediction direction, which is set in the temporary prediction mode index, directly to be the prediction mode used to code the coding target pixel P(0, 0).

In the above determining process, the following weighting processes may be applicable. The temporary prediction mode determining unit 16 will execute the following decision inequalities.

$$D10 < D11/2$$

$$D10 < D01/2$$

$$Dm11 < D11/2$$

$$Dm11 < D01/2$$

If the above decision inequalities are all met, the temporary prediction mode determining unit 16 will execute the following decision inequalities. If at least one of the above decision inequalities is not met, the temporary prediction mode determining unit 16 will set a direction, where the difference value is the minimum, to the temporary prediction mode index.

$$E10<E01/2$$

$$E10<E11/2$$

If the above two decision inequalities are both met, the temporary prediction mode determining unit 16 will determine that the first prediction point pixel P(0, 1) is likely to be an upper-right vertex pixel of the checker block and then will set the left prediction to the temporary prediction mode index. If one or both of the above two decision inequalities is not met, the temporary prediction mode determining unit 16 will set a direction, where the difference value is the minimum, to the temporary prediction mode index.

Figure 11:
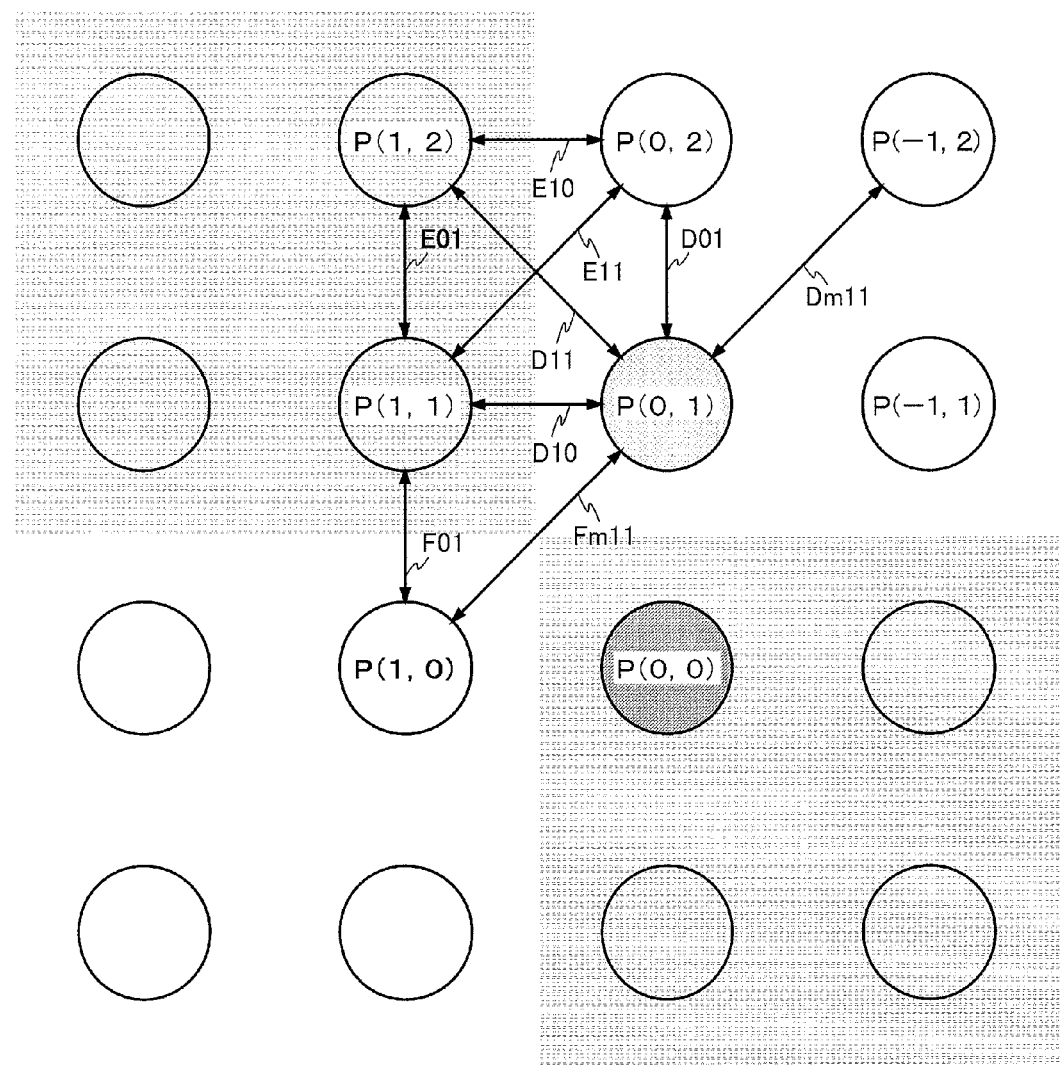
FIG. 11 is a diagram to explain a determining process for determining whether or not a first prediction point pixel P(0, 1) is a lower-left vertex pixel of a checker block.

FIG. 11 is a diagram to explain a determining process for determining whether or not the first prediction point pixel p(0, 1) is a lower-left vertex pixel of a checker block. The temporary prediction mode determining unit 16 calculates a difference value D11 between the first prediction point pixel P(0, 1) and the first reference pixel P(1, 2), a difference value D01 between the first prediction point pixel P(0, 1) and the second reference pixel P(0, 2), a difference value Dm11 between the first prediction point pixel P(0, 1) and the third reference pixel P(−1, 2), and a difference value D10 between the first prediction point pixel P(0, 1) and the fourth reference pixel P(1, 1).

If the difference value D01 is smaller than the difference value D11, if the difference value D01 is smaller than the difference value D10 and if the difference value Dm11 is smaller than the difference value D10, the temporary prediction mode determining unit 16 will calculate a difference value E10 between the first reference pixel P(1, 2) and the second reference pixel P(0, 2), a difference value E01 between the first reference pixel P(1, 2) and the fourth reference pixel P(1, 1), and a difference value E11 between the second reference pixel P(0, 2) and the fourth reference pixel P(1, 1).

Assume that the difference value E01 is smaller than the difference value E10, the difference value E01 is smaller than the difference value E11 and also assume that there exists a pixel, among the pixels that have already been coded, which has been determined to having a possibility of being a vertex pixel of a checker block (particularly an upper-left vertex pixel or lower-left vertex pixel). Then the temporary prediction mode determining unit 16 determines that there is a possibility that the first prediction point pixel P(0, 1) is a lower-left vertex pixel of the checker block. The temporary prediction mode determining unit 16 will set a value, indicating the possibility that the first prediction point pixel P(0, 1) is a lower-left vertex pixel of the checker block, to the temporary prediction mode index.

If the above value, indicating the possibility that the first prediction point pixel P(0, 1) is a lower-left vertex pixel of the checker block, is set to the temporary prediction mode index, the final prediction mode determining unit 18 calculates a difference value F01 between the second prediction point pixel P(1, 0), which is a left neighboring pixel of the object pixel P(0, 0), and the fourth reference pixel P(1, 1) and a difference value Fm11 between the second prediction point pixel P(1, 0) and the first reference pixel P(0, 1). If the difference value Fm11 is smaller than the difference value F01 (Fm11<F01), the final prediction mode determining unit 18 will determine the upper-left prediction to be the final prediction mode. If the difference value Fm11 is greater than or equal to the difference value F01 (Fm11≥F01), the upward prediction will be determined to be the final prediction mode.

In the above determining process, the following weighting processes may be applicable. The temporary prediction mode determining unit 16 will execute the following decision inequalities.

$$D01<D11/2$$

$$D01<D10/2$$

$$Dm11<D10/2$$

If the above decision inequalities are all met, the temporary prediction mode determining unit 16 will execute the following decision inequalities. If at least one of the above decision inequalities is not met, the temporary prediction mode determining unit 16 will set a direction, where the difference value is the minimum, to the temporary prediction mode index.

$$E01<E10/2$$

$$E01<E11/2$$

If the above two decision inequalities are both met and there exists a pixel, among the pixels that have already been coded, which has been determined to having a possibility of being a vertex pixel of a checker block, the temporary prediction mode determining unit 16 will set a value, indicating the possibility that the first prediction point pixel P(0, 1) is a lower-left vertex pixel of the checker block, to the temporary prediction mode index. If one or both of the above two decision inequalities is not met, the temporary prediction mode determining unit 16 will set a direction, where the difference value is the minimum, to the temporary prediction mode index.

Figure 12:
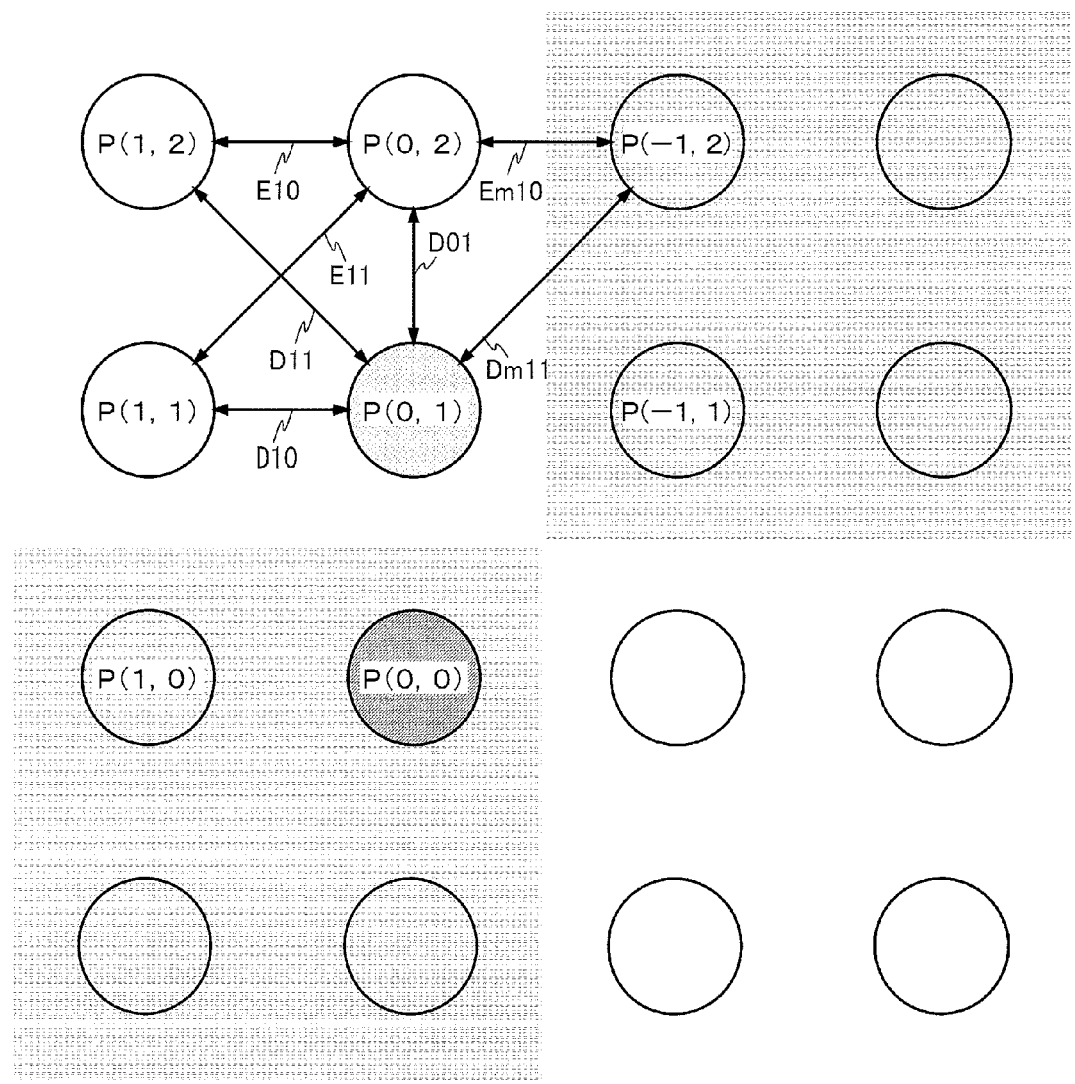
FIG. 12 is a diagram to explain a determining process for determining whether or not a first prediction point pixel P(0, 1) is a lower-right vertex pixel of a checker block.

FIG. 12 is a diagram to explain a determining process for determining whether or not the first prediction point pixel p(0, 1) is a lower-right vertex pixel of a checker block. The temporary prediction mode determining unit 16 calculates a difference value D11 between the first prediction point pixel P(0, 1) and the first reference pixel P(1, 2), a difference value D01 between the first prediction point pixel P(0, 1) and the second reference pixel P(0, 2), a difference value Dm11 between the first prediction point pixel P(0, 1) and the third reference pixel P(−1, 2), and a difference value D10 between the first prediction point pixel P(0, 1) and the fourth reference pixel P(1, 1).

If, among the four difference values, the difference value Dm11 is dominantly larger than the other difference values, the temporary prediction mode determining unit 16 will calculate a difference value E10 between the first reference pixel P(1, 2) and the second reference pixel P(0, 2), a difference value Em10 between the second reference pixel P(0, 2) and the third reference value P(−1, 2), and a difference value E11 between the second reference pixel P(0, 2) and the fourth reference pixel P(1, 1). If the difference value E10 is smaller than the difference value Em10 and if the difference value E11 is smaller than the difference value Em10, the temporary prediction mode determining unit 16 will determine that the first prediction point pixel P(0, 1) is more likely to a lower-right vertex pixel of a checker block and will set a left prediction to the temporary prediction mode index. The final prediction mode determining unit 18 finally determines the prediction direction, which is set in the temporary prediction mode index, directly to be the prediction mode used to code the coding target pixel P(0, 0).

In the above determining process, the following weighting processes may be applicable. The temporary prediction mode determining unit 16 will execute the following decision inequalities.

$$D11 < Dm11/2$$

$$D01 < Dm11/2$$

$$D10 < Dm11/2$$

If the above decision inequalities are all met, the temporary prediction mode determining unit 16 will execute the following decision inequalities. If at least one of the above decision inequalities is not met, the temporary prediction mode determining unit 16 will set a direction, where the difference value is the minimum, to the temporary prediction mode index.

$$E10 < Em10/2$$

$$E11 < Em10/2$$

If the above two decision inequalities are both met, the temporary prediction mode determining unit 16 will determine that the first prediction point pixel P(0, 1) is likely to be a lower-right vertex pixel of the checker block and then will set the left prediction to the temporary prediction mode index. If one or both of the above two decision inequalities is not met, the temporary prediction mode determining unit 16 will set a direction, where the difference value is the minimum, to the temporary prediction mode index.

A description has been given of the determining processes for determining whether or not the first prediction point pixel P(0, 1) are an upper-left vertex pixel of the checker block, an upper-right vertex pixel thereof, a lower-left vertex pixel thereof and a lower-right vertex pixel thereof, respectively. All or part of these determining processes may be added to the basic processing for determining a prediction direction.

By employing the first embodiment as described above, the coding efficiency can be improved by employing a method whereby the relation between an object pixel and its neighboring pixels is estimated based on the relation between a pixel located one line above the object pixel and its neighboring pixels so as to generate a prediction error value based on the estimated relation. More specifically, the prediction point pixel is set at two pixel locations that are a pixel located one line above the object pixel and a left neighboring pixel of the object pixel. Thereby, whether or not the prediction point pixel is a pixel located at a cross point of checker patterns, namely whether or not the prediction point pixel is a vertex pixel of a checker box, can be determined accurately. This can prevent a prediction direction whose difference from the object pixel is large from being selected, when the prediction point pixel is a vertex pixel of the checker box. Hence, this can suppress an increase in the amount of prediction codes when the prediction point pixel is a vertex pixel of the checker box.

Also, the first embodiment can achieve the prediction processing with a small number of neighboring pixels used to determine the prediction direction, a small circuit scale and a small buffer capacity. Also, where software is implemented, the amount of computation is small and therefore the first embodiment can be achieved with low-cost processor and memory.

Figure 13:
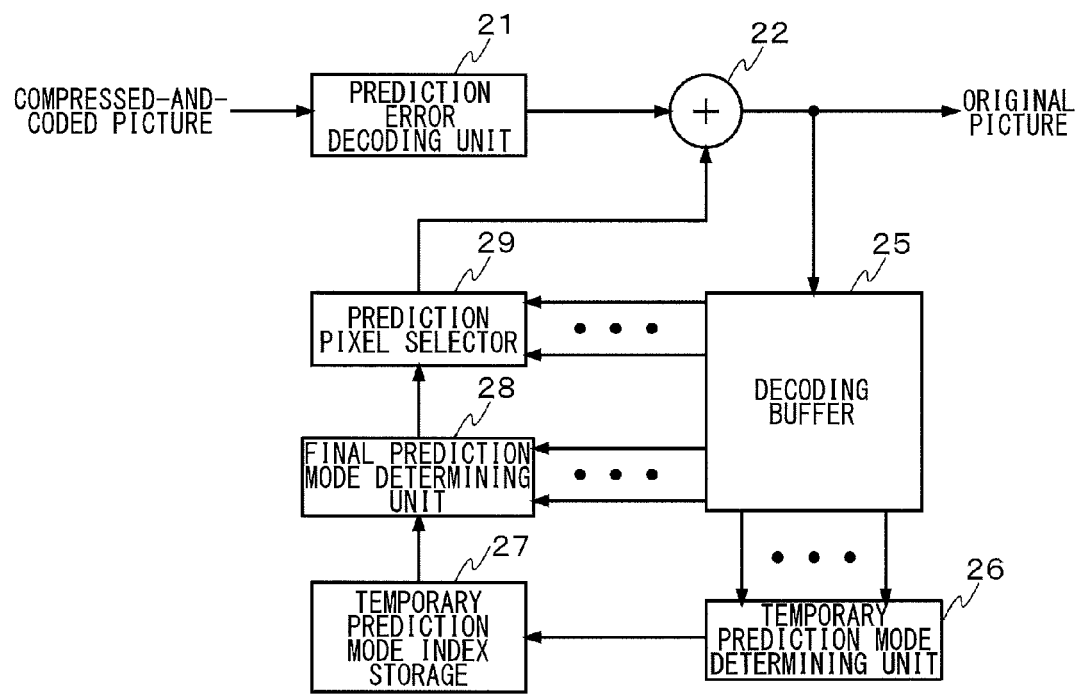
FIG. 13 shows a structure of a picture decoding apparatus according to a second embodiment of the present invention.

FIG. 13 shows a structure of a picture decoding apparatus 20 according to a second embodiment of the present invention. The picture decoding apparatus 20 includes a prediction error decoding unit 21, an adder 22, a decoding buffer 25, a temporary prediction mode determining unit 26, a temporary prediction mode index storage 27, a final prediction mode determining unit 28, and a prediction pixel selector 29.

The prediction error decoding unit 21 receives the input of a prediction error value of a decoding target pixel of a picture compressed and coded by the picture coding apparatus 10 according to the first embodiment. The prediction error decoding unit 21 decodes the coded prediction error value in accordance with an expansion-decoding scheme corresponding to the compression-coding scheme used in the prediction error coding unit 12 of FIG. 1. The prediction error decoding unit 21 outputs the decoded prediction error value to the adder 22.

The adder 22 adds up the decoded prediction error value and a prediction error value selected by the prediction pixel selector 29, thereby restoring a value of the decoding target pixel. The adder 22 outputs the restored decoding-target pixel to the exterior and outputs it to the decoding buffer 25.

The decoding buffer 25 is a buffer used in a FIFO (First In, First Out) method and is a buffer that temporarily stores the decoded pixel values for the number of pixels set. The decoding buffer 25 corresponds to the local decoding buffer 15 of the picture coding apparatus 10 according to the first embodiment, and is provided with the same storage area as that of the local decoding buffer 15.

The temporary prediction mode determining unit 26 temporarily determines a prediction mode used to decode the decoding target pixel, based on a relation between a decoded value of an already-decoded pixel neighboring one line above the decoding target pixel and decoded values of already-decoded pixels surrounding said neighboring pixel. The temporary prediction mode determining unit 26 reads out the decoded values of the first prediction point pixel, the second reference pixel, the third reference pixel and the fourth reference pixel from the decoding buffer 25 and then temporarily determines a prediction mode, based on the relation among those decoded values. The temporary prediction mode determining unit 26 sets a value, indicating the temporarily determined prediction mode, in a temporary prediction mode index and then outputs said value set in the index to the temporary prediction mode index storage 27.

The temporary prediction mode index storage 27 temporarily stores the temporary prediction mode index inputted from the temporary prediction mode determining unit 26. The temporary prediction mode index storage 27 delays the inputted temporary prediction mode index by a processing time for one line before outputting the index to the final prediction mode determining unit 28.

The final prediction mode determining unit 28 finally determines a prediction mode used to decode the decoding target pixel, based on the temporary prediction mode index of the decoding target pixel read from the temporary prediction mode index storage 27 and a relation between a decoded value of an already-decoded pixel located at least to the left of the decoding target pixel and decoded values of already-decoded pixels surrounding said pixel located at least to the left thereof. More specifically, the final prediction mode determining unit 28 reads out the temporary prediction mode index from the temporary prediction mode index storage 27, reads out the decoded values of the second prediction point pixel, the fourth reference pixel and the first prediction point pixel from the decoding buffer 25, and finally determines the prediction mode, based on the temporary prediction mode index and the relation among those decoded values. The final prediction mode determining unit 28 outputs a value indicating the finally determined prediction mode to the prediction pixel selector 29.

The prediction pixel selector 29 selects a prediction pixel of the decoding target pixel, based on the value, indicating the prediction mode, which is inputted from the final prediction mode determining unit 28, and then reads out the decoded value of this prediction pixel from the decoding buffer 25. More specifically, one of the upper-left neighboring pixel, the immediately-above pixel, the upper-right neighboring pixel and the left neighboring pixel of the decoding target pixel stored in the decoding buffer 25 is selected according to the prediction mode. The prediction pixel selector 29 outputs the value of the selected prediction pixel to the adder 22.

The decoding buffer 25, the temporary prediction mode determining unit 26, the temporary prediction mode index storage 27, the final prediction mode determining unit 28, and the prediction pixel selector 29 of the picture decoding apparatus 20 according to the second embodiment basically performs the same processings as those of the local decoding buffer 15, the temporary prediction mode determining unit 16, the temporary prediction mode index storage 17, the final prediction mode determining unit 18, and the prediction pixel selector 19 of the picture coding apparatus 10 according to the first embodiment, respectively. Thus the same prediction pixel of an object image is selected by both the picture coding apparatus 10 and the picture decoding apparatus 20.

Figure 14:
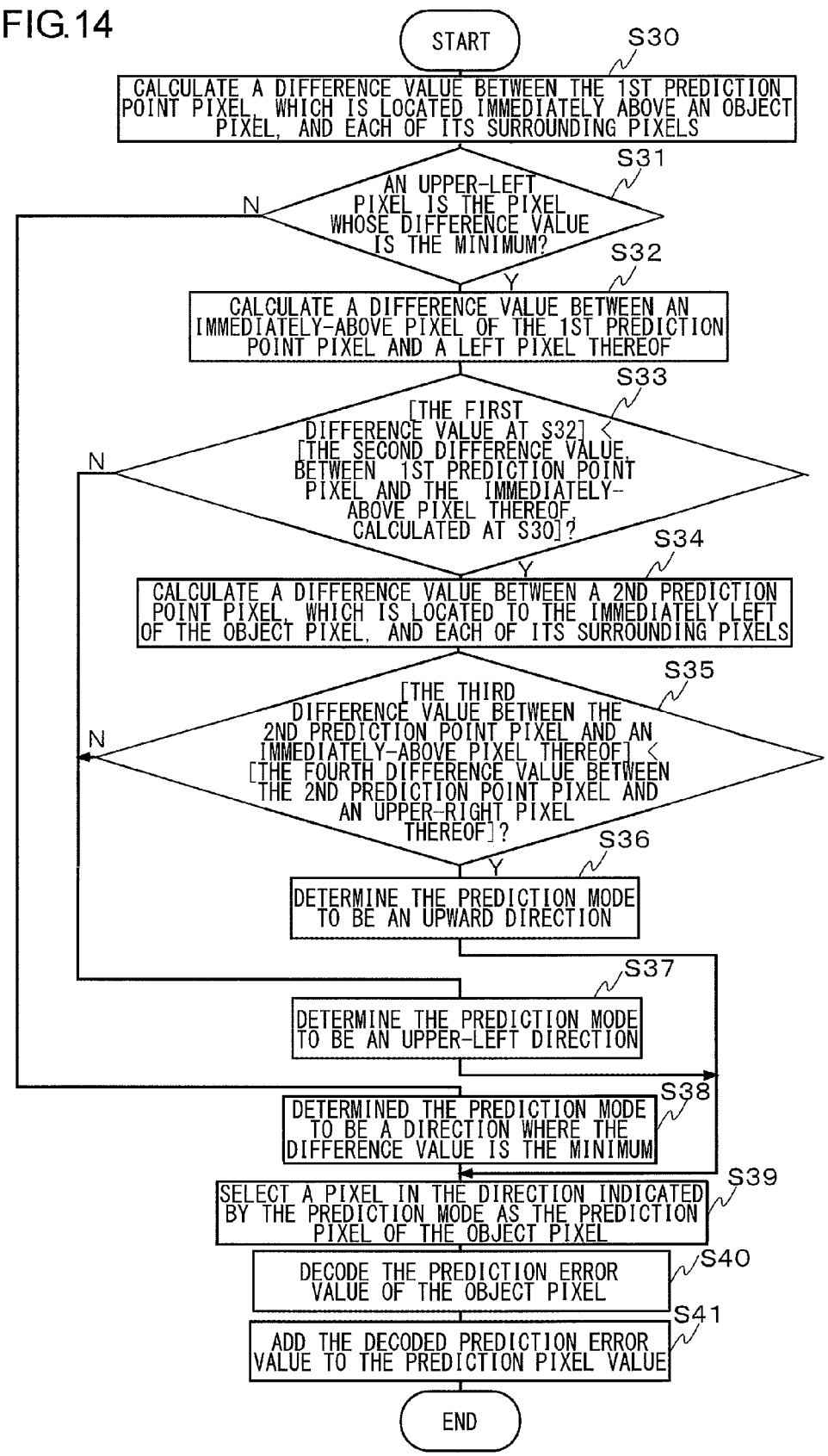
FIG. 14 is a flowchart to explain a decoding process, for an object pixel, carried out by a picture decoding apparatus according to a second embodiment of the present invention.

FIG. 14 is a flowchart to explain a decoding process, for an object pixel, carried out by the picture decoding apparatus 20 according to the second embodiment of the present invention. The temporary prediction mode determining unit 26 calculates a difference value between the first prediction point pixel, which is located just above the coding target pixel and each of pixels, which surround the first prediction point pixel (S30). The temporary prediction mode determining unit 26 determines if the surrounding pixel whose difference value is the minimum is the upper-left neighboring pixel (S31). If the surrounding pixel having the minimum value is not the upper-left neighboring pixel (N of S31), the temporary prediction mode determining unit 26 and the final prediction mode determining unit 28 will determine a prediction mode to be a direction where the difference value is the minimum (S38). If the surrounding pixel having the minimum value is the upper-left neighboring pixel (Y of S31), the temporary prediction mode determining unit 26 will calculate a difference value between an immediately-above pixel of the first prediction point pixel and the left neighboring pixel thereof (S32).

The temporary prediction mode determining unit 26 compares the difference value (first difference value), between the immediately-above pixel of the first prediction point pixel and the left pixel thereof, calculated at Step S32 with the difference value (second difference value), between the first prediction point pixel and the immediately-above pixel of the first prediction point pixel, calculated at Step S30 (S33). If the first difference value is greater than or equal to the second difference value (N of S33), the temporary prediction mode determining unit 26 and the final prediction mode determining unit 28 will determine a prediction mode to be an upper-left direction (S37). If the first difference value is less than the second difference value (Y of S33), the temporary prediction mode determining unit 26 will calculate a difference value of a second prediction point pixel, which is located to the immediately left of the decoding target pixel, and each of surrounding pixels that surround the second prediction point pixel (S34).

The temporary prediction mode determining unit 26 compares the difference value (third difference value), between the second prediction point pixel and an immediately-above pixel of this second prediction point pixel, with the difference value (fourth difference value), between the second prediction point pixel and an upper-right neighboring pixel of this second prediction point pixel (S35). If the third difference value is greater than or equal to the fourth difference value (N of S35), the temporary prediction mode determining unit 26 and the final prediction mode determining unit 28 will determine a prediction mode to be an upper-left direction (S37). If the third difference value is less than the fourth difference value (Y of S35), the temporary prediction mode determining unit 26 and the final prediction mode determining unit 28 will determine a prediction mode to be an upward direction (S36).

After the prediction mode has been determined (S36, S37, or S38), the prediction pixel selector 29 selects a pixel, which is positioned adjacent to a direction indicated by the prediction mode, as the prediction pixel of the decoding target pixel (S39). The prediction error decoding unit 21 decodes the prediction error value of coded decoding-target pixel (S40). The adder 22 the selected prediction pixel value to the decoded prediction error value so as to restore a decoding target pixel value (S41).

By employing the second embodiment as described above, the pictures compressed and the coded according to the first embodiment can be decoded. If the picture coding apparatus 10 according to the first embodiment and the picture decoding apparatus 20 according to the second embodiment are connected on the same bus, an amount of picture data passing through the bus can be compressed. Thus the load of a system that mounts the picture coding apparatus 10 according to the first embodiment and the picture decoding apparatus 20 according to the second embodiment can be reduced and the processing delay can be suppressed.

It goes without saying that the coding-related and decoding-related processings as described above can be accomplished by transmitting, storing and receiving apparatuses using hardware. Also, the processings can be accomplished by firmware stored in Read Only Memory (ROM), flash memory or the like, or realized by software such as a computer. A firmware program and a software program may be recorded in a recording medium readable by a computer or the like and then made available. Also, the firmware program and the software program may be made available from a server via a wired or wireless network. Further, the firmware program and the software program may be provided through the data broadcast by terrestrial or satellite digital broadcasting.

The present invention has been described based on the embodiments. The embodiments are intended to be illustrative only, and it is understood by those skilled in the art that various modifications to constituting elements or an arbitrary combination of each process could be further developed and that such modifications are also within the scope of the present invention.

In the above description, for example, a pixel located just above a coding target pixel is used as a pixel, neighboring the coding target pixel, which is located one line above the coding target pixel. Though the immediately-above pixel of the coding target pixel is most preferable as the pixel located one line above the coding target pixel, an upper-left neighboring pixel thereof or an upper-right neighboring pixel thereof is not excluded as the candidates for the prediction point pixel. Also, a pixel located above the coding target pixel by two or more lines, instead of the pixel one above the coding target pixel, may be used for the processing as long as the prediction accuracy lies in a permitted range.

What is claimed is:

1. A picture coding apparatus comprising:
a temporary prediction mode determining unit configured to temporarily determine a prediction mode used to code a coding target pixel, based on a relation between a decoded value of a locally decoded pixel neighboring at least one line above the coding target pixel and decoded values of locally decoded pixels surrounding said neighboring pixel, and configured to set a value, indicating the temporarily determined prediction mode, to a temporary prediction mode index;

a temporary prediction mode index storage configured to store the temporary prediction mode index;

a final prediction mode determining unit configured to finally determine a prediction mode used to code the coding target pixel, based on the temporary prediction mode index of the coding target pixel read from the temporary prediction mode index storage and a relation between a decoded value of a locally decoded pixel located at least to the left of the coding target pixel and decoded values of locally decoded pixels surrounding said pixel located at least to the left thereof;

a prediction pixel selector configured to select a prediction pixel of the coding target pixel, based on the finally determined prediction mode;

a subtractor configured to subtract the value of the prediction pixel from the value of the coding target pixel; and a prediction error coding unit configured to code a prediction error value derived by the subtractor, wherein the temporary prediction mode determining unit temporarily determines the prediction mode used to code a coding target pixel P(0, 0), based on a relation between each value of a first prediction point pixel P(0, 1), which is located immediately above the coding target pixel P(0, 0), a first reference pixel P(1, 2), which is an upper-left neighboring pixel of the first prediction point pixel P(0, 1), a second reference pixel P(0, 2), which is an immediately-above pixel of the first prediction point pixel P(0, 1), a third reference pixel P(−1, 2), which is an upper-right neighboring pixel of the first prediction point pixel P(0, 1), and a fourth reference pixel P(1, 1), which is a left neighboring pixel of the first prediction point pixel P(0, 1), wherein, it is assumed that a pixel, whose difference value from the first prediction point pixel P(0, 1) is minimum, is the first reference pixel P(1, 2), when a first difference value between the first prediction point pixel P(0, 1) and the first reference pixel P(1, 2) is greater than or equal to a second difference value between the second reference pixel P(0, 2) and the fourth reference pixel P(1, 1), the temporary prediction mode determining unit sets a value, indicating an upper-left prediction, to the temporary prediction mode index, and when the first difference value is less than the second difference value, the temporary prediction mode determining unit sets a value, indicating possibility that the first prediction point pixel P(0, 1) is an upper-left vertex pixel of a block forming a checker pattern, to the temporary prediction mode index.

2. A picture coding apparatus according to claim 1, wherein, when a value, which indicates the upper-left prediction, an upward prediction, an upper-right prediction or a left prediction, is set to the temporary prediction mode index, the final prediction mode determining unit finally determines the prediction direction to be the prediction mode used to code the coding target pixel P(0, 0), and wherein, when the value, indicating possibility that the first prediction point pixel P(0, 1) is the upper-left vertex pixel, is set to the temporary prediction mode index, the final prediction mode determining unit finally determines the prediction mode, based on a relation between each value of a second prediction point pixel P(1, 0), which is a left neighboring pixel of the coding target pixel P(0, 0), the fourth reference pixel P(1, 1), which is an immediately-above pixel of the second prediction point pixel P(1, 0), and the first prediction point pixel P(0, 1), which is an upper-right neighboring pixel of the second prediction point pixel P(1, 0), and wherein, when the value, indicating possibility that the first prediction point pixel P(0, 1) is the upper-left vertex pixel, is set to the temporary prediction mode index, and when a third difference value between the second prediction point pixel P(1, 0) and the fourth reference pixel P(1, 1) is greater than or equal to a fourth difference value between the second prediction point pixel P(1, 0) and the first prediction point pixel P(0, 1), the final prediction mode determining unit finally determines the upper-left direction to be the prediction mode, and when the value, indicating possibility that it is the upper-left vertex pixel, is set to the temporary prediction mode index, and when the third difference value is less than the fourth difference value, the final prediction mode determining unit finally determines the upward direction to be the prediction mode.

3. A non-transitory computer-readable medium having embedded thereon a picture coding program, the picture coding program comprising:

a temporary prediction mode determining module operative to temporarily determine a prediction mode used to code a coding target pixel, based on a relation between a decoded value of a locally decoded pixel neighboring at least one line above the coding target pixel and decoded values of locally decoded pixels surrounding said neighboring pixel, and setting a value, indicating the temporarily determined prediction mode, to a temporary prediction mode index;

a final prediction mode determining module operative to finally determine a prediction mode used to code the coding target pixel, based on the temporary prediction mode index of the coding target pixel and a relation between a decoded value of a locally decoded pixel located at least to the left of the coding target pixel and decoded values of locally decoded pixels surrounding said pixel located at least to the left thereof;

a prediction pixel selection module operative to select a prediction pixel of the coding target pixel, based on the finally determined prediction mode;

a subtraction module operative to subtract the value of the prediction pixel from the value of the coding target pixel; and a prediction error coding module operative to code a prediction error value derived by the subtraction module, wherein the temporary prediction mode determining module temporarily determines the prediction mode used to code a coding target pixel P(0, 0), based on a relation between each value of a first prediction point pixel P(0, 1), which is located immediately above the coding target pixel P(0, 0), a first reference pixel P(1, 2), which is an upper-left neighboring pixel of the first prediction point pixel P(0, 1), a second reference pixel P(0, 2), which is an immediately-above pixel of the first prediction point pixel P(0, 1), a third reference pixel P(−1, 2), which is an upper-right neighboring pixel of the first prediction point pixel P(0, 1), and a fourth reference pixel P(1, 1), which is a left neighboring pixel of the first prediction point pixel P(0, 1), wherein, it is assumed that a pixel, whose difference value from the first prediction point pixel P(0, 1) is minimum, is the first reference pixel P(1, 2), when a first difference value between the first prediction point pixel P(0, 1) and the first reference pixel P(1, 2) is greater than or equal to a second difference value between the second reference pixel P(0, 2) and the fourth reference pixel P(1, 1), the temporary prediction mode determining module sets a value, indicating an upper-left prediction, to the temporary prediction mode index, and when the first difference value is less than the second difference value, the temporary prediction mode determining module sets a value, indicating possibility that the first prediction point pixel P(0, 1) is an upper-left vertex pixel of a block forming a checker pattern, to the temporary prediction mode index.

4. A picture decoding apparatus comprising:

a temporary prediction mode determining unit configured to temporarily determine a prediction mode used to decode a decoding target pixel, based on a relation between a decoded value of an already-decoded pixel neighboring at least one line above the decoding target pixel and decoded values of already-decoded pixels surrounding said neighboring pixel, and configured to set a value, indicating the temporarily determined prediction mode, to a temporary prediction mode index;

a temporary prediction mode index storage configured to store the temporary prediction mode index;

a final prediction mode determining unit configured to finally determine a prediction mode used to decode the decoding target pixel, based on the temporary prediction mode index of the decoding target pixel read from the temporary prediction mode index storage and a relation between a decoded value of an already-decoded pixel located at least to the left of the decoding target pixel and decoded values of already-decoded pixels surrounding said pixel located at least to the left thereof;

a prediction pixel selector configured to select a prediction pixel of the decoding target pixel, based on the finally determined prediction mode;

a prediction error decoding unit configured to decode a prediction error value of the coded decoding-target pixel; and an adder configured to restore the value of the decoding target pixel by adding up the selected prediction pixel and the decoded prediction error value, wherein the temporary prediction mode determining unit temporarily determines the prediction mode used to decode a decoding target pixel P(0, 0), based on a relation between each value of a first prediction point pixel P(0, 1), which is located immediately above the coding target pixel P(0, 0), a first reference pixel P(1, 2), which is an upper-left neighboring pixel of the first prediction point pixel P(0, 1), a second reference pixel P(0, 2), which is an immediately-above pixel of the first prediction point pixel P(0, 1), a third reference pixel P(−1, 2), which is an upper-right neighboring pixel of the first prediction point pixel P(0, 1), and a fourth reference pixel P(1, 1), which is a left neighboring pixel of the first prediction point pixel P(0, 1), wherein, it is assumed that a pixel, whose difference value from the first prediction point pixel P(0, 1) is minimum, is the first reference pixel P(1, 2), when a first difference value between the first prediction point pixel P(0, 1) and the first reference pixel P(1, 2) is greater than or equal to a second difference value between the second reference pixel P(0, 2) and the fourth reference pixel P(1, 1), the temporary prediction mode determining unit sets a value, indicating an upper-left prediction, to the temporary prediction mode index, and when the first difference value is less than the second difference value, the temporary prediction mode determining unit sets a value, indicating possibility that the first prediction point pixel P(0, 1) is an upper-left vertex pixel of a block forming a checker pattern, to the temporary prediction mode index.

5. A picture decoding apparatus according to claim 4, wherein, when a value, which indicates the upper-left prediction, an upward prediction, an upper-right prediction or a left prediction, is set to the temporary prediction mode index, the final prediction mode determining unit finally determines the prediction direction to be the prediction mode used to decode the decoding target pixel P(0, 0), and wherein, when the value, indicating possibility that the first prediction point pixel P(0, 1) is the upper-left vertex pixel, is set to the temporary prediction mode index, the final prediction mode determining unit finally determines the prediction mode, based on a relation between each value of a second prediction point pixel P(1, 0), which is a left neighboring pixel of the coding target pixel P(0, 0), the fourth reference pixel P(1, 1), which is an immediately-above pixel of the second prediction point pixel P(1, 0), and the first prediction point pixel P(0, 1), which is an upper-right neighboring pixel of the second prediction point pixel P(1, 0), and wherein, when the value, indicating possibility that the first prediction point pixel P(0, 1) is the upper-left vertex pixel, is set to the temporary prediction mode index, and when a third difference value between the second prediction point pixel P(1, 0) and the fourth reference pixel P(1, 1) is greater than or equal to a fourth difference value between the second prediction point pixel P(1, 0) and the first prediction point pixel P(0, 1), the final prediction mode determining unit finally determines the upper-left direction to be the prediction mode, and when the value, indicating possibility that it is the upper-left vertex pixel, is set to the temporary prediction mode index, and when the third difference value is less than the fourth difference value, the final prediction mode determining unit finally determines the upward direction to be the prediction mode.

6. A non-transitory computer-readable medium having embedded thereon a picture decoding program, the picture decoding program comprising:

a temporary prediction mode determining module operative to temporarily determine a prediction mode used to decode a decoding target pixel, based on a relation between a decoded value of an already-decoded pixel neighboring at least one line above the decoding target pixel and decoded values of already-decoded pixels surrounding said neighboring pixel, and setting a value, indicating the temporarily determined prediction mode, to a temporary prediction mode index;

a final prediction mode determining module operative to finally determine a prediction mode used to decode the decoding target pixel, based on the temporary prediction mode index of the decoding target pixel and a relation between a decoded value of an already-decoded pixel located at least to the left of the decoding target pixel and decoded values of already-decoded pixels surrounding said pixel located at least to the left thereof;

a prediction pixel selection module operative to select a prediction pixel of the decoding target pixel, based on the finally determined prediction mode;

a prediction error decoding module operative to decode a prediction error value of the coded decoding-target pixel; and an adding module operative to restore the value of the decoding target pixel by adding up the selected prediction pixel and the decoded prediction error value, wherein the temporary prediction mode determining module temporarily determines the prediction mode used to decode a decoding target pixel $P(0, 0)$, based on a relation between each value of a first prediction point pixel $P(0, 1)$, which is located immediately above the coding target pixel $P(0, 0)$, a first reference pixel $P(1, 2)$, which is an upper-left neighboring pixel of the first prediction point pixel $P(0, 1)$, a second reference pixel $P(0, 2)$, which is an immediately-above pixel of the first prediction point pixel $P(0, 1)$, a third reference pixel $P(-1, 2)$, which is an upper-right neighboring pixel of the first prediction point pixel $P(0, 1)$, and a fourth reference pixel $P(1, 1)$, which is a left neighboring pixel of the first prediction point pixel $P(0, 1)$, wherein, it is assumed that a pixel, whose difference value from the first prediction point pixel $P(0, 1)$ is minimum, is the first reference pixel $P(1, 2)$, when a first difference value between the first prediction point pixel $P(0, 1)$ and the first reference pixel $P(1, 2)$ is greater than or equal to a second difference value between the second reference pixel $P(0, 2)$ and the fourth reference pixel $P(1, 1)$, the temporary prediction mode determining module sets a value, indicating an upper-left prediction, to the temporary prediction mode index, and when the first difference value is less than the second difference value, the temporary prediction mode determining module sets a value, indicating possibility that the first prediction point pixel $P(0, 1)$ is an upper-left vertex pixel of a block forming a checker pattern, to the temporary prediction mode index.

\* \* \* \* \*